United States Patent
Kraus et al.

(10) Patent No.: US 11,446,957 B2
(45) Date of Patent: Sep. 20, 2022

(54) WHEEL BEARING UNIT

(71) Applicant: Schaeffler Technologies AG & Co. KG, Herzogenaurach (DE)

(72) Inventors: Manfred Kraus, Herzogenaurach (DE); Holger Kaup, Erlangen (DE); Kerstin Beyer, Höchstadt a. d. Aisch (DE); Peter Niebling, Bad Kissingen (DE); Alexander Seiffer, Karlsruhe (DE); Michael Oliver Kobes, Höchstadt a.d. Aisch (DE); Lucas Gruener, Fürth (DE); Berthold Krautkrämer, Gochsheim (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 369 days.

(21) Appl. No.: 16/497,870

(22) PCT Filed: Feb. 22, 2018

(86) PCT No.: PCT/DE2018/100158
§ 371 (c)(1),
(2) Date: Sep. 26, 2019

(87) PCT Pub. No.: WO2018/184622
PCT Pub. Date: Oct. 11, 2018

(65) Prior Publication Data
US 2020/0101792 A1    Apr. 2, 2020

(30) Foreign Application Priority Data

Apr. 7, 2017   (DE) ................... 10 2017 003 514.8
Jul. 6, 2017    (DE) ................... 10 2017 115 071.4

(51) Int. Cl.
*B60B 27/00*  (2006.01)
*B60B 3/16*   (2006.01)
(Continued)

(52) U.S. Cl.
CPC ............ *B60B 27/0094* (2013.01); *B60B 3/16* (2013.01); *B60B 5/02* (2013.01); *B60B 27/02* (2013.01);
(Continued)

(58) Field of Classification Search
CPC ......... B60B 2900/111; B60B 2360/341; B60B 2310/208; B60B 3/16; B60B 5/02; B60B 27/0094; B60B 27/02
See application file for complete search history.

(56) References Cited

U.S. PATENT DOCUMENTS 1,230,427 A * 6/1917 Murray .................. B60B 27/00
                                                    301/105.1
7,441,841 B1 * 10/2008 Chen ...................... B60B 1/041
                                                         301/58
(Continued)

FOREIGN PATENT DOCUMENTS

CN    102107584 A    6/2011
CN    104608552 A    5/2015
(Continued)

OTHER PUBLICATIONS

Michael F. Ashby, in Materials Selection in Mechanical Design (Fourth Edition), 2011 accessed at https://www.sciencedirect.com/topics/engineering/low-thermal-diffusivity on Dec. 17, 2020. (Year:2011) (Year: 2011).*

*Primary Examiner* — Scott A Browne

(57) ABSTRACT

A hybrid connection element, in particular a bearing outer element of a wheel bearing, includes a core part made of steel and a reinforcement part made of plastic. The reinforcement part at least partially encases the core part. The core part includes a hollow cylindrical bearing unit extending in an axial direction and a flange extending in a radial direction. The reinforcement part includes at least one (Continued)

reinforcement rib which transmits force between the bearing unit and the flange of the core part.

12 Claims, 3 Drawing Sheets

(51) Int. Cl.
    *B60B 5/02*     (2006.01)
    *B60B 27/02*     (2006.01)

(52) U.S. Cl.
    CPC ... *B60B 2310/204* (2013.01); *B60B 2310/208* (2013.01); *B60B 2360/102* (2013.01); *B60B 2360/341* (2013.01); *B60B 2900/111* (2013.01); *B60B 2900/112* (2013.01)

(56) References Cited

U.S. PATENT DOCUMENTS

| | | | | |
|---|---|---|---|---|
| 2008/0296965 | A1* | 12/2008 | Hofmann | B60B 27/0026 301/106 |
| 2008/0303339 | A1* | 12/2008 | Niebling | B60B 27/00 301/106 |

FOREIGN PATENT DOCUMENTS

| | | |
|---|---|---|
| CN | 105939869 A | 9/2016 |
| DE | 102014206843 A1 | 4/2014 |
| EP | 1070604 A1 | 1/2001 |
| EP | 1859958 A1 | 11/2007 |
| EP | 2725245 A1 | 4/2014 |
| EP | 2863082 A1 | 4/2015 |
| FR | 3037529 A1 | 12/2016 |
| JP | 201555307 A | 3/2015 |

\* cited by examiner

WHEEL BEARING UNIT

CROSS-REFERENCE TO RELATED APPLICATIONS

This application is the U.S. National Phase of PCT Appln. No. PCT/DE2018/100158 filed Feb. 22, 2018, which claims priority to DE 10 2017 003 514.8 filed Apr. 7, 2017 and DE 10 2017 115 071.4 filed Jul. 6, 2017, the entire disclosures of which are incorporated by reference herein.

TECHNICAL FIELD

The disclosure relates to a wheel bearing unit or hybrid connection element, in particular a bearing outer element of a wheel bearing for securing a vehicle wheel, having a core part made of a first material, and a reinforcement part made of a second material.

BACKGROUND

Current wheel bearings are embodied as solid steel flanges. Moreover, various embodiments of a wheel bearing as a plastic-steel and aluminum-steel hybrid or as a hybrid connection element are known from patent applications.

In this context, mention may be made of EP2863082A1 and DE102014206843A1, EP2863082A1 describing a wheel bearing flange embodied as a star shape.

Thus, it is possible, for example, to apply a plastic, by injection molding for example, to steel parts in order to increase rigidity and strength, wherein the plastic assumes some of the loadbearing task of the steel.

In this case, the plastic can be reinforced with fibers, and the use both of thermosets and thermoplastics is also possible.

The conventional design approach in the configuration of such plastic components is to cover force introduction surfaces with a plastic layer that has a thickness dependent on the loading and manufacturing conditions.

A reinforcement made of plastic is introduced between the force introduction surfaces for the purpose of load transfer, and therefore the reinforcement is normal to the force introduction surfaces, which are often at right angles to one another, has a straight profile and merges into these surfaces at 45°.

However, such wheel bearings or wheel bearing units or hybrid connection elements have a relatively high weight owing to the massive and, in some cases, nondirectional use of plastic.

SUMMARY

It is therefore beneficial to specify a hybrid connection element, in particular a bearing outer element of a wheel bearing for securing a vehicle wheel, which can be produced at low cost and in a manner that saves materials and which is embodied in a manner that is optimized in terms of weight and, preferably, strength.

It is furthermore beneficial to reduce the weight of the wheel bearing or hybrid connection element, to achieve the rigidity and service life of conventional wheel bearings or hybrid connection elements to the same extent or to exceed them and in a favorable manner to obtain interfaces with respect to surrounding components.

A hybrid connection element, in particular a bearing outer element of a wheel bearing for securing a vehicle wheel, comprises a core part made of a first material, and a reinforcement part made of a second material.

It is advantageous if the reinforcement part at least partially encases the core part and thus reinforces the latter.

It is also of advantage if the core part comprises a hollow cylindrical bearing unit for forming a rolling bearing, which preferably extends in the axial direction. It is thus possible, for example, to provide an outer ring of a rolling bearing by means of the bearing unit.

The core part advantageously comprises a flange, which preferably extends in the radial direction from one axial end of the bearing unit. With the aid of the flange, it is possible to attach a wheel rim of a vehicle wheel to the hybrid connection element, for example.

As an option, the reinforcement part comprises at least one reinforcement rib, which advantageously transmits forces between the bearing unit and the flange of the core part. In this way, the rigidity and strength of the hybrid connection element can be improved and the weight can be optimized.

It is furthermore preferred if the at least one reinforcement rib has a shape which is designed to match the flow of force between the flange and the bearing unit. Overall, a bionically inspired overall shape reminiscent of the roots of a tree is preferably obtained.

The at least one reinforcement rib preferably comprises a first end and a second end.

It is advantageous if the first end is arranged on the bearing unit and is offset in the axial direction relative to the flange. With the aid of the first end, forces can be absorbed by the bearing unit or transferred to the latter.

It is also advantageous if the second end is arranged on the flange and is offset outward in the radial direction from the bearing unit. The second end can thus transmit forces in the direction of the flange and away from the flange.

It is furthermore advantageous if the at least one reinforcement rib bridges at least one weight-reduction aperture in the flange in the radial direction. It is thereby possible to transmit forces across the aperture by means of the reinforcement part.

It is furthermore possible to arrange two reinforcement ribs per aperture in the flange in the radial direction in order to transmit forces.

It is furthermore advantageous if the hybrid connection element has two reinforcement ribs per aperture, which preferably tangentially adjoin or touch an aperture in the flange. In this way, it is possible for forces acting on an aperture to be absorbed and transmitted by a reinforcement rib.

The at least one reinforcement rib is preferably of hollow design in order to save weight.

It is also advantageous if the height of each reinforcement rib decreases in the radial direction from the inside at the bearing unit to the outside, toward the flange. Explained in simple terms, it is thus possible for each reinforcement rib to be configured in accordance with the profile of the effective moments or effective tilting moments.

In other words, it is advantageous if, in the radial direction, the height of the at least one reinforcement rib is greater on the inside at the bearing unit than the radially outer outside of the flange.

It is furthermore preferred if the shape of the at least one reinforcement rib is designed to flow smoothly into the shape of another reinforcement rib. In this way, it is possible to avoid notch action effects, thereby making it possible to increase the stability of the hybrid connection element.

It is also preferred if the shape of the at least one reinforcement rib is designed to flow smoothly into the shape of another reinforcement rib at the respective end of the reinforcement rib. It is preferable if each reinforcement rib is shaped as a region of the reinforcement part which is designed as a peak.

A region of the reinforcement part which is designed as a trough is preferably arranged between two reinforcement ribs.

It is also advantageous if the transition from one reinforcement rib to another reinforcement rib runs via a region designed as a trough.

It is furthermore advantageous if the transition from a region designed as a peak to a region designed as a trough and vice versa is designed to flow smoothly.

With the aid of the abovementioned embodiments as a peak and/or as a trough, it is possible to further reduce the weight of the hybrid connection element while simultaneously retaining mechanical stability. Embodiment as a peak and/or as a trough preferably involves free-form surfaces.

It is furthermore advantageous if two reinforcement ribs which are arranged around an aperture or around a fastening socket of the flange are designed to flow smoothly in the circumferential direction. Thus, two reinforcement ribs enclose or surround an aperture or a fastening socket of the flange. It is also possible for transfer to take place from one reinforcement group to another reinforcement group in the tangential direction or in the circumferential direction.

It is advantageous if the flange is in the form of a circular ring.

The flange preferably comprises at least one aperture in order to reduce the weight of the hybrid connection element.

It is also possible to envisage arranging a plurality of apertures in a manner uniformly distributed in the circumferential direction.

It is furthermore preferred if the at least one aperture is designed as a slotted hole or as a connecting passage.

The aperture designed as a slotted hole preferably has a kidney-shaped configuration.

It is furthermore possible for the at least one aperture preferably to extend in the circumferential direction and/or to completely penetrate the flange in the axial direction. In other words, it is also possible for the at least one aperture merely to reduce the thickness or material thickness of the flange.

The aperture acting as a connecting passage is preferably designed as a through hole in the axial direction in order to improve force transmission by the first material of the core part and the second material of the reinforcement part.

It is also advantageous if the flange comprises at least one fastening socket for fastening a wheel rim of a vehicle.

The at least one fastening socket preferably has a thread for a rim screw.

It is also preferred if at least two reinforcement ribs are arranged at each fastening socket, in particular in tangential contact. In other words, it is advantageous if the at least two reinforcement ribs "embrace" or "enclose" or "surround" each fastening socket. Thus, effective forces can be absorbed and transmitted in a simple manner.

It is also advantageous if the hybrid connection element has at least one reinforcement rib per fastening socket. The hybrid connection element preferably has at least three or at least five fastening sockets to enable a vehicle wheel, for example, to be secured on the hybrid connection element.

It may furthermore be advantageous for the hollow cylindrical bearing unit to comprise at least one rolling element race on the inner lateral surface.

It is furthermore advantageous if the hollow cylindrical bearing unit comprises, on the outer lateral surface, a surface structure which comprises an enlarged surface for improved connection to the second material. This makes it possible to ensure improved force transmission between the core part and the reinforcement part.

It is furthermore possible for the surface structure to be achieved with the aid of an adhesion promoter and/or with the aid of laser structures and/or with the aid of a blasting process, e.g. sandblasting, and/or with the aid of plasma activation.

The flange preferably comprises, at least on the surface oriented toward the bearing unit, a surface structure which has an enlarged surface for improved connection to the second material. This makes it possible to ensure improved force transmission between the core part and the reinforcement part.

It is furthermore advantageous if the reinforcement part comprises a socket, in particular for a vehicle rim. Here, the socket preferably serves for the centering of the vehicle rim during attachment to the hybrid connection element.

It is advantageous if the socket extends the bearing unit of the core part in the axial direction.

The socket preferably extends the bearing unit of the core part in the axial direction at the axial end of the bearing unit at which the flange is arranged.

It is also preferred if the core part and the flange are formed integrally and from the first material.

The core part and the flange are preferably embodied as a forging.

It is furthermore advantageous if the first material has a higher density than the second material. It is thereby possible to reduce the weight of the hybrid connection element.

It is furthermore advantageous if the second material is a plastic, preferably a fiber reinforced thermoset.

Provision can furthermore be made for the second material to be applied to the first material in an injection molding process or a compression molding process.

It is advantageous if the first and the second material are connected firmly to one another. It is thereby possible to transmit forces in an optimum manner.

The thermal expansion coefficient of the first material preferably differs from the thermal expansion coefficient of the second material by +/−10%, preferably by +/−2%.

It is also advantageous if the surface of the at least one reinforcement rib encloses an angle of between 35 degrees and 95 degrees with the bearing unit or with the flange.

The surface of the at least one reinforcement rib preferably encloses an angle in a range of between 35 degrees and 55 degrees, in particular 45 degrees, with the surface of the bearing unit.

It is also advantageous if the surface of the at least one reinforcement rib encloses an angle in a range of between 75 degrees and 95 degrees, in particular 90 degrees, with the surface of the flange.

With the aid of the abovementioned degree specifications, forces can be absorbed and transmitted efficiently.

Explained in simplified terms, this concept preferably relates to a hybrid connection element, in particular a bearing outer element of a wheel bearing for securing a vehicle wheel, having a core part made of a first material, and a reinforcement part made of a second material, which at least partially encases and thus reinforces the core part.

The components and the composite structure comprising the components are advantageously distinguished as follows:

a bearing or core part of the hybrid connection element is preferably in the form of a metallic element, preferably made of steel;

wheel bolts, threaded sleeves or fastening sockets are preferably connected via the flange of the core part to the bearing or bearing unit of the core part, and are preferably likewise made of steel;

the flange of the core part is preferably embodied as a forging;

a second component or a reinforcement part is preferably used, on the one hand, to increase the rigidity of the bearing or core part of the hybrid connection element and, on the other hand, this component can have further functional areas, e.g. the centering of a rim.

By virtue of the reinforcement of the bearing or core part by the second component or a reinforcement part made of a material of relatively low density, the metal portion of the flange of the core part and thus the weight of the wheel bearing or hybrid connection element can be reduced;

the second component or reinforcement part is preferably formed from a plastic, preferably from a thermoset reinforced with (short-staple) fibers. The thermoset employed can best be processed by means of injection molding or a compression molding process. This advantageously has a thermal expansion coefficient close to that of steel or the core part;

the plastic component or reinforcement part can preferably rest directly on the steel flange of the core part or can form a cavity between the plastic of the reinforcement part and the flange of the core part in order to form the cavities between the second component or reinforcement part and the flange of the core part. For this purpose, the core of the injection mold passes through the spokes of the metallic wheel bearing flange or core part. It is also possible to use a slide when injection molding.

Additional measures can be taken in order to increase the adhesion between the second component or reinforcement part and the flange of the core part. In the case of a second component made of plastic, this can be achieved by means of surface structuring of the steel component (sandblasting, laser structuring, milling) or the use of adhesion promoters, for example. It is also worth considering compatibility of the adhesion promoter both with the steel (core part) and with the plastic component (reinforcement part). It is expedient here to make an advantageous selection of the material basis of the adhesion promoter such that it is similar to that of the plastic component or reinforcement part.

BRIEF DESCRIPTION OF THE DRAWINGS

The connection element is explained in greater detail below by means of an illustrative embodiment in conjunction with associated drawings. In these schematic drawings.

DETAILED DESCRIPTION

In the description below, identical reference signs are used for identical objects.

Figure 1:
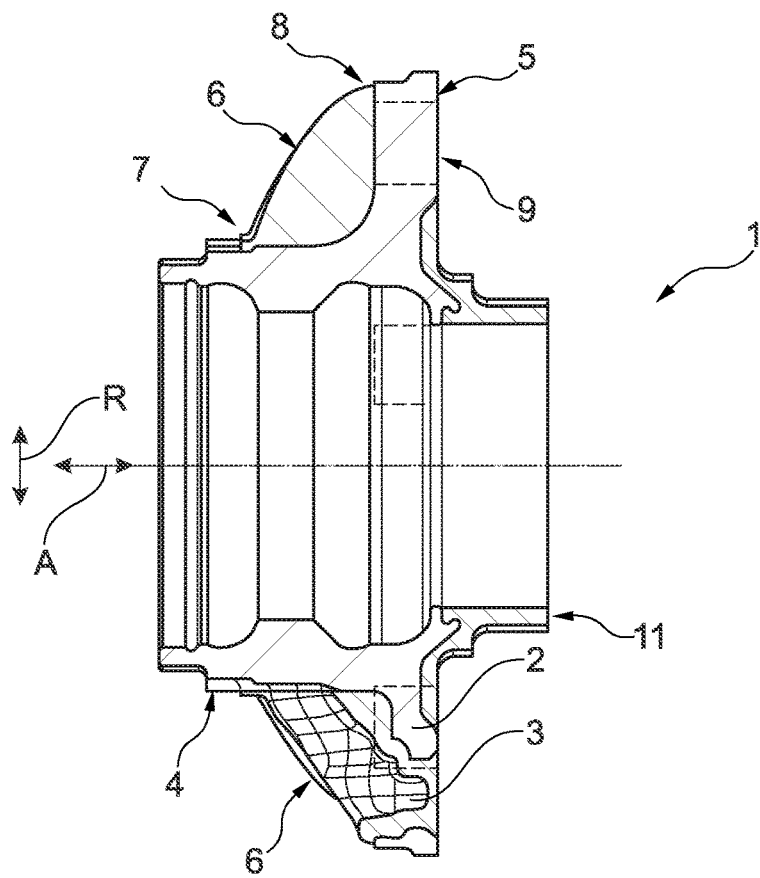
FIG. 1 shows a sectional view of a hybrid connection element.

FIG. 1 shows a sectional view of a hybrid connection element 1.

To be more precise, FIG. 1 shows a hybrid connection element, in particular a bearing outer element 1 of a wheel bearing for securing a vehicle wheel, having a core part 2 made of a first material, and a reinforcement part 3 made of a second material.

The reinforcement part 3 at least partially encases the core part 2 and thus reinforces the latter. This state of affairs is illustrated even better in the other figures.

In this case, the core part 2 has a hollow cylindrical bearing unit 4 for forming a rolling bearing, which extends in the axial direction A.

In this arrangement, the hollow cylindrical bearing unit 4 has rolling element races on the inner lateral surface to form a rolling bearing.

The core part 2 comprises a flange 5, which extends in the radial direction R from one axial end of the bearing unit 4.

The reinforcement part 3 furthermore comprises various reinforcement ribs 6, which transmit forces between the bearing unit 4 and the flange 5 of the core part 2.

Each reinforcement rib 6 has a shape which is designed or adapted to match the flow of force between the flange 5 and the bearing unit 4, wherein each reinforcement rib 6 has a first end 7 and a second end 8.

In this case, the first end 7 is arranged on the bearing unit 4 and is offset in the axial direction A relative to the flange 5, wherein the second end 8 is arranged on the flange 5 and is offset outward in the radial direction R from the bearing unit 4.

Figure 2:
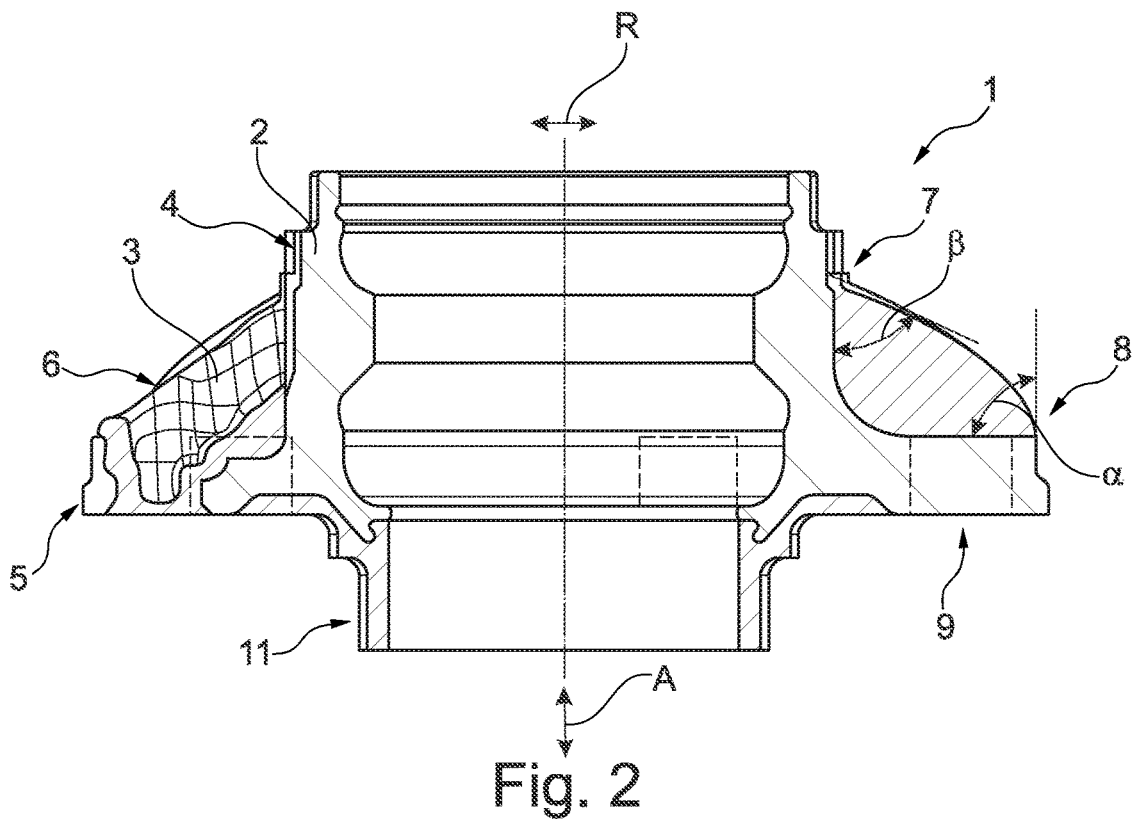
FIG. 2 shows another sectional view of a hybrid connection element.

FIG. 1, but also FIG. 2, furthermore shows that the height of each reinforcement rib 6 decreases in the radial direction R from the inside at the bearing unit 4 to the outside, toward the flange 5.

In other words, in the radial direction R, the height of each reinforcement rib 6 is greater on the inside at the bearing unit 4 than the radially outer outside of the flange 5.

Although not apparent in the figures, the hollow cylindrical bearing unit 4 nevertheless has, on the outer lateral surface, a surface structure which comprises an enlarged surface for improved connection to the second material. This makes it possible to ensure improved force transmission between the core part 2 and the reinforcement part 3.

The flange 5 also has, at least on the surface oriented toward the bearing unit 4, a surface structure which comprises an enlarged surface for improved connection to the second material. This likewise makes it possible to ensure improved force transmission between the core part 2 and the reinforcement part 3.

As FIG. 1 also shows, the core part 2 has a socket 11 for a vehicle rim, wherein the socket 11 extends the bearing unit 4 of the core part 2 in the axial direction A.

In this case, the socket 11 extends the bearing unit 4 of the core part 2 in the axial direction A at the axial end of the bearing unit 4 at which the flange 5 is arranged.

As all the figures furthermore show, the core part 2 and the flange 5 are formed integrally and from the first material, wherein the core part 2 and the flange 5 are embodied as a steel forging.

According to the illustrative embodiment illustrated, the first material has a higher density than the second material, thereby making it possible to reduce the weight of the hybrid connection element 1.

The second material is a plastic or a fiber reinforced thermoset, wherein the second material can be applied to the first material in an injection molding process or a compression molding process.

The thermal expansion coefficient of the first material differs from the thermal expansion coefficient of the second material by +/−2%.

FIG. 2 shows another sectional view of the hybrid connection element 1.

As regards the further statements, attention is drawn to the explanations according to FIG. 1, which are likewise applicable here, in order to avoid unnecessary repetition.

However, in addition to FIG. 1, FIG. 2 shows that the surface of each reinforcement rib 6 encloses an angle β of 55 degrees with the bearing unit 4, whereas the surface of each reinforcement rib 6 encloses an angle α of 90 degrees with the surface of the flange 5.

Figure 3:
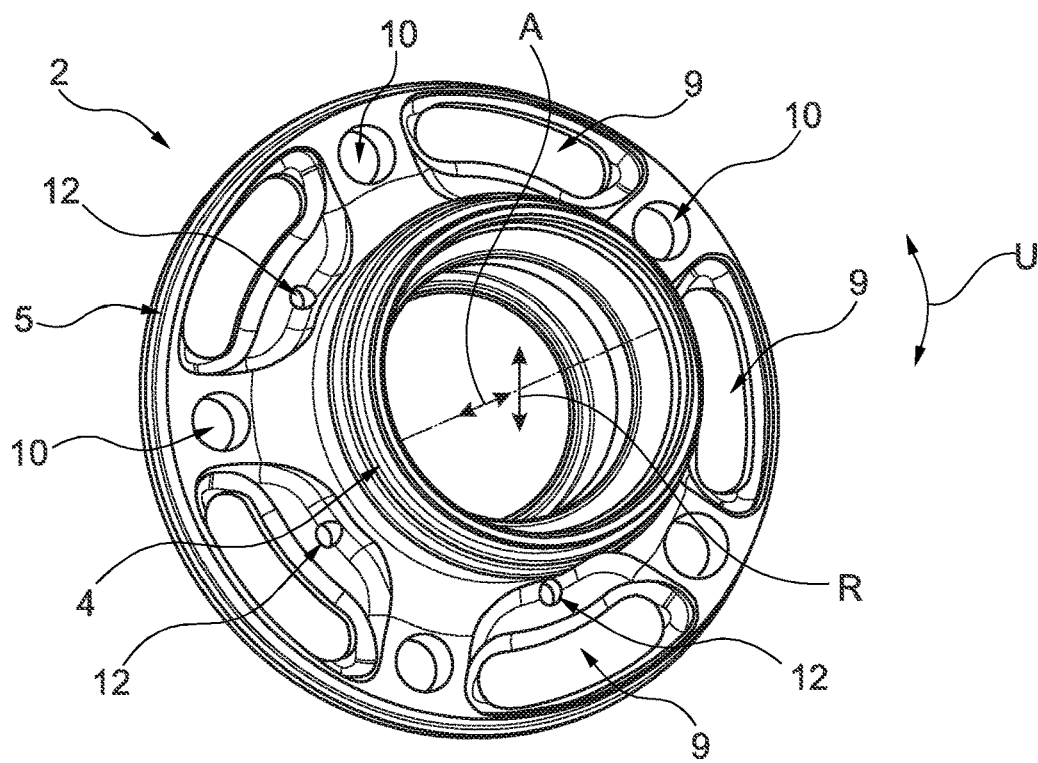
FIG. 3 shows a three-dimensional view of a core part of the hybrid connection element from FIGS. 1 and 2.
Figure 4:
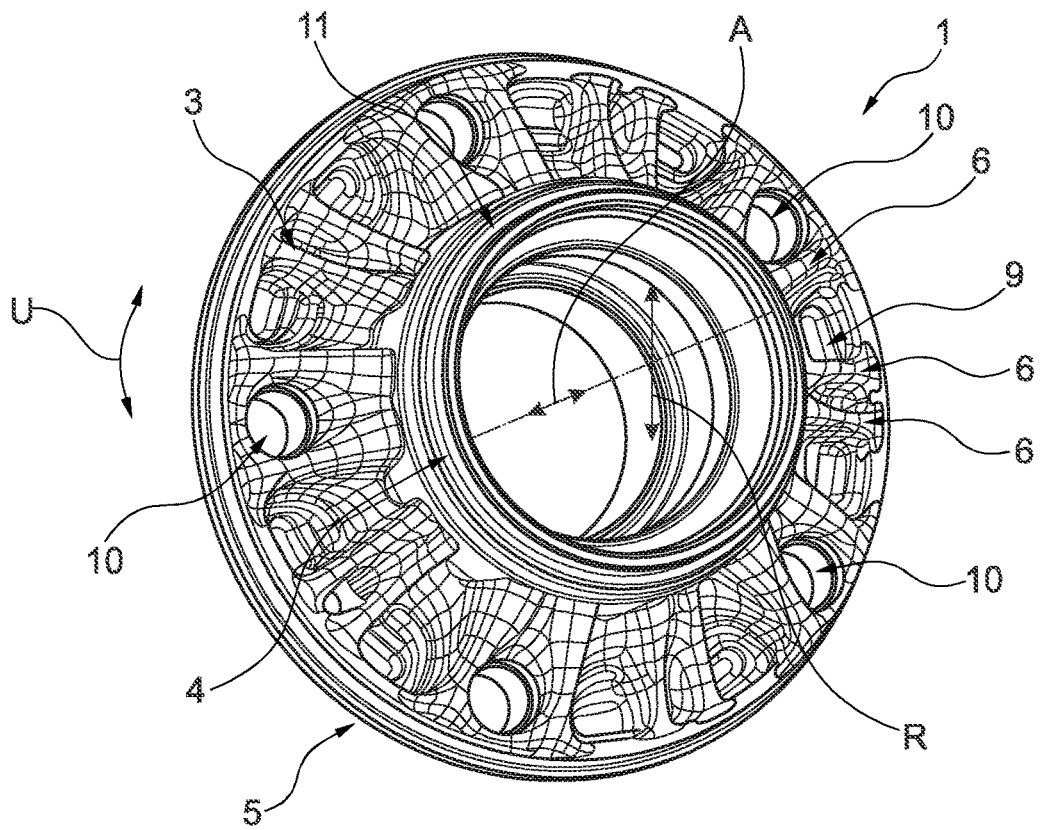
FIG. 4 shows a three-dimensional view of the hybrid connection element from FIGS. 1 and 2.

FIG. 3 shows a three-dimensional view of a core part 2 of the hybrid connection element 1 from FIGS. 1 and 2, whereas FIG. 4 shows a three-dimensional view of the hybrid connection element 1 from FIGS. 1 and 2.

Figure 5:
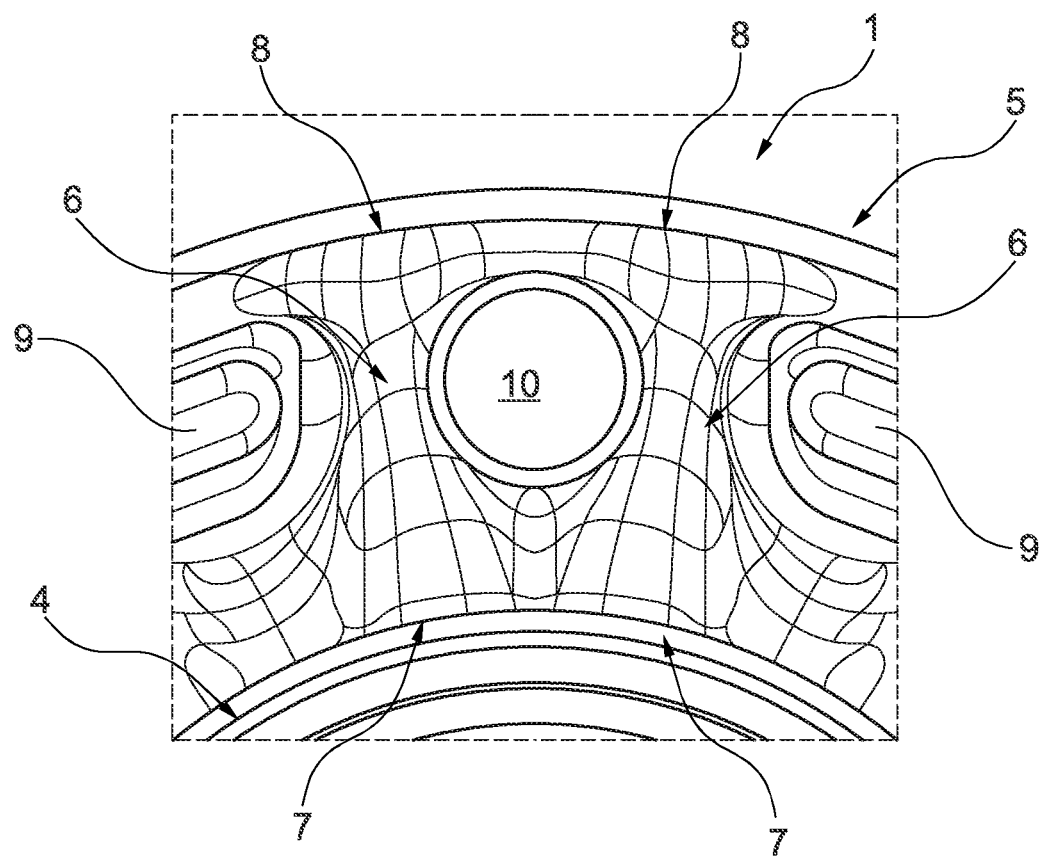
FIG. 5 shows a three-dimensional partial view of the hybrid connection element from FIGS. 1 to 4.

FIG. 5 furthermore shows a three-dimensional partial view of the hybrid connection element 1 from FIGS. 1 to 4.

As regards the further statements, attention is drawn to the explanations according to FIGS. 1 and 2, which are likewise applicable here, in order to avoid unnecessary repetition.

For the sake of simplicity and to avoid repetition, FIGS. 3, 4 and 5 are described together below.

As can be seen from FIGS. 3 to 5, two reinforcement ribs 6 in each case bridge a weight-reduction aperture 9 in the flange 5 in the radial direction R. As a result, it is possible to transmit forces across the aperture 9 by means of the reinforcement part 3 and to increase tilting stiffness.

In this case, the two reinforcement ribs 6 per aperture 9 tangentially adjoin one aperture 9 in the flange 5.

In the example under consideration, the reinforcement ribs 6 are designed as solid parts but it is also possible for one or more or all of the reinforcement ribs 6 to be of hollow design in order to further reduce the weight of the hybrid connection element.

Considering, in particular, FIGS. 3 and 4, it can be seen that the shape of a reinforcement rib 6 is designed to flow smoothly into the shape of another reinforcement rib 6.

Moreover, the shape of a reinforcement rib 6 is designed to flow smoothly into the shape of another reinforcement rib 6 at the respective end of the reinforcement rib 6—cf. FIG. 5.

In this case, each reinforcement rib 6 is shaped as a region of the reinforcement part 3 which is designed as a peak, wherein a region of the reinforcement part 3 which is designed as a trough is arranged between two reinforcement ribs 6.

In other words, the transition from one reinforcement rib 6 to another reinforcement rib 6 passes via a region designed as a trough, wherein the transition from a region designed as a peak to a region designed as a trough and vice versa is designed to flow smoothly.

With the aid of an embodiment of the hybrid connection element 1 which is designed for mutual merging or fusion or smooth transitions, notch action effects can be avoided.

As FIGS. 3 to 5 furthermore show, two reinforcement ribs 6 which are arranged around an aperture 9 or around a fastening socket 10 of the flange 5 are designed to flow smoothly in the circumferential direction U.

FIG. 3 shows that the flange 5 is in the form of a circular ring, wherein the flange 5 comprises various apertures 9 in order to reduce the weight of the hybrid connection element 1.

In this case, the apertures 9 are arranged in a manner uniformly distributed in the circumferential direction U, wherein each aperture 9 is designed as a slotted hole.

The aperture 9 designed as a slotted hole has a kidney-shaped configuration, wherein each aperture 9 extends in the circumferential direction U and completely penetrates the flange 5 in the axial direction A.

The flange 5 furthermore has apertures 12, which are arranged in a manner uniformly distributed in the circumferential direction U, wherein each aperture 12 is designed as a connecting passage 12.

The aperture 12 acting as a connecting passage is designed as a through hole in the axial direction A in order to improve force transmission by the first material of the core part 2 and the second material of the reinforcement part 3.

The flange 5 furthermore has various fastening sockets 10 for fastening a wheel rim of a vehicle, wherein each fastening socket 10 has a thread for a rim screw.

Two reinforcement ribs 6 are also arranged in tangential contact at each fastening socket 10. In other words, the reinforcement ribs 6 fully "embrace" or "enclose" or "surround" each fastening socket 10.

The figures are described once again below in a supplementary way.

The design of the plastic component or reinforcement part 3 is obtained from a topology optimization and has struts or reinforcement ribs 6 around regions which have to be reinforced to a greater extent, e.g. threaded holes or fastening sockets 10 or between the threaded holes.

In this case, the ribs or reinforcement ribs 6 between the threaded holes or fastening sockets 10 are optional and can vary or be completely omitted, depending on the rigidity requirement (cf. FIG. 2, for example).

In the area around drill holes or fastening sockets 10 or other apertures 9 which coincide with load introduction regions, it is advisable for the struts or reinforcement ribs 6 to extend as close as possible to the fastening sockets 10.

This furthermore means that the strut shape or the shape of the reinforcement ribs 6 hugs the aperture 9. Overall, a bionically inspired overall shape is obtained, which preferably approximately resembles the roots of a tree when used on round flanges 5.

The angles at which the supporting struts or reinforcement ribs 6 emerge from the various force introduction surfaces have various optimum values, depending on the loading case.

More specifically, angles in a range of from 35° to 55° (ideally 45°) may be mentioned here for the transmission of shear, and angles between 75° and 95° (ideally 90° angle) may be mentioned here for the transmission of normal forces.

For mixed loads, values between the stated angles are recommended (FIG. 4).

A good profile shape of a supporting strut or reinforcement rib 6 can be interpolated from the optimum angles at the edge points or ends 7, 8, thus ensuring that the profile shape has transitions which are smooth as possible between various angles. In the case of 90°-45°, therefore, a convex shape is obtained in the profile, for example.

The configuration around drill holes or fastening sockets 10 corresponds to very organic shapes. The crucial point here is that the strut or reinforcement rib 6 hugs the upper edge of the drill hole or fastening socket 10, as is the fusion of the struts/reinforcement rib 6 on both sides of the hole in the lower region.

The shape of two struts/reinforcement ribs 6 around a circular drill hole/fastening socket 10 subjected principally to compression, when viewed from the front for example, is as shown in FIG. 5 when the loading on the steel flange or flange 5 is applied over an area and is primarily normal.

LIST OF REFERENCE SIGNS 1 hybrid connection element
2 core part
3 reinforcement part
4 bearing unit
5 flange
6 reinforcement rib
7 first end
8 second end
9 aperture
10 fastening socket
11 socket
12 aperture
A axial direction
R radial direction
α angle
β angle

The invention claimed is:

1. A hybrid connection element, in particular a bearing outer element of a wheel bearing for securing a vehicle wheel,
having a core part made of a first material, and
a reinforcement part made of a second material, which at least partly encases and thus reinforces the core part,
wherein the core part comprises a hollow cylindrical bearing unit for forming a rolling bearing, which extends in an axial direction,
wherein the core part comprises a flange, which extends in a radial direction from one axial end of the bearing unit,
wherein the reinforcement part comprises at least one reinforcement rib, which transmits forces between the bearing unit and the flange of the core part,
wherein the at least one reinforcement rib comprises two reinforcing ribs that bridge a weight-reduction aperture in the flange in the radial direction in order to transmit forces across the aperture by means of the reinforcement part, and
wherein the at least one reinforcement rib is of hollow design in order to save weight.

2. The hybrid connection element of claim 1,
wherein the at least one reinforcement rib comprises a first end and a second end,
wherein the first end is arranged on the bearing unit and is offset in the axial direction relative to the flange,
wherein the second end is arranged on the flange and is offset outward in the radial direction from the bearing unit.

3. The hybrid connection element of claim 1,
wherein the at least one reinforcement rib further comprises two additional reinforcement ribs, which tangentially adjoin the weight reduction aperture or a fastening socket in the flange.

4. The hybrid connection element of claim 1,
wherein, in the radial direction, the height of the at least one reinforcement rib is greater on the inside at the bearing unit than the radially outer outside of the flange.

5. The hybrid connection element of claim 1,
wherein each reinforcement rib is shaped as a region of the reinforcement part which is designed as a peak, wherein the transition from one reinforcement rib to another reinforcement rib runs via a region of the reinforcement part designed as a trough.

6. The hybrid connection element of claim 1,
wherein the flange is in the form of a circular ring,
wherein the flange comprises a connecting passage designed as a through hole in the axial direction in order to improve force transmission by the first material of the core part and the second material of the reinforcement part.

7. The hybrid connection element of claim 1,
wherein the flange comprises at least one fastening socket for fastening a wheel rim of a vehicle,
wherein the at least one fastening socket has a thread for a rim screw,
wherein at least two reinforcement ribs are arranged at each fastening socket in tangential contact.

8. The hybrid connection element of claim 1,
wherein the hollow cylindrical bearing unit comprises at least one rolling element race on the inner lateral surface,
wherein the hollow cylindrical bearing unit comprises, on the outer lateral surface, a surface structure which comprises an enlarged surface for improved connection to the second material, thereby ensuring improved force transmission between the core part and the reinforcement part,
wherein the flange comprises, at least on the surface oriented toward the bearing unit, a surface structure which comprises an enlarged surface for improved connection to the second material, thereby making it possible to ensure improved force transmission between the core part and the reinforcement part.

9. The hybrid connection element of claim 1,
wherein the reinforcement part comprises a socket, in particular for a vehicle rim,
wherein the socket extends the bearing unit of the core part in the axial direction,
wherein the socket extends the bearing unit of the core part in the axial direction at the axial end of the bearing unit at which the flange is arranged.

10. The hybrid connection element of claim 1,
wherein the core part and the flange are formed integrally and from the first material,
wherein the core part and the flange are embodied as a forging,
wherein the first material has a higher density than the second material, thereby making it possible to reduce the weight of the hybrid connection element,
wherein the second material is a fiber reinforced thermoset plastic,
wherein the thermal expansion coefficient of the first material differs from the thermal expansion coefficient of the second material by +/−10%.

11. A hybrid bearing outer element of a wheel bearing comprising:
a core part, made of a first material, having a hollow cylindrical bearing unit which extends in an axial direction and a flange which extends in a radial direction from one axial end of the bearing unit; and
a reinforcement part made of a second material, at least partially encasing the core part and having multiple hollow reinforcing ribs extending across a weight reduction aperture of the core part in the radial direction.

12. The hybrid bearing outer element of claim 11, wherein the multiple hollow reinforcing ribs comprise two hollow reinforcement ribs per weight reduction aperture in the flange.

* * * * *